United States Patent [19]
Maxon et al.

[11] 3,725,596
[45] Apr. 3, 1973

[54] PBX AUTOMATIC NUMBER IDENTIFICATION SYSTEM

[75] Inventors: Rodney Robert Maxon; Henry August Meise, Jr., both of Boulder, Colo.

[73] Assignee: Bell Telephone Laboratories, Incorporated, Murray Hill, N.J.

[22] Filed: Nov. 12, 1971

[21] Appl. No.: 198,217

[52] U.S. Cl. .......... 179/18 FH
[51] Int. Cl. .......... H04q 3/72
[58] Field of Search .......... 179/18 FH, 18 D, 18 DA, 179/27 DB, 27 CB, 18 BD, 18 BE

[56] References Cited

UNITED STATES PATENTS 3,346,700 10/1967 Anderson et al. .......... 179/27 DB

*Primary Examiner*—Kathleen H. Claffy
*Assistant Examiner*—Kenneth D. Baugh
*Attorney*—R. J. Guenther et al.

[57] ABSTRACT

A PBX is disclosed having equipment for automatically generating and transmitting calling station and trunk number information to a central office on outgoing calls. The disclosed system is an improvement in the art in that it does not require additional equipment, such as matrices, for generating the number information. Instead, it obtains this information from pre-existing system circuitry which generates the same information in order to control the establishment of the network paths required for the serving of these calls.

18 Claims, 12 Drawing Figures

PBX AUTOMATIC NUMBER IDENTIFICATION SYSTEM

BACKGROUND OF THE INVENTION

1. Field of the Invention

This invention relates to a telephone system and, in particular, to a private branch exchange (PBX) system having equipment for automatically identifying the calling station and trunk used on calls outgoing to a central office.

2. Description of the Prior Art

It is common practice to provide automatic number identification (ANI) equipment in a PBX which transmits information to a central office identifying the calling station and trunk number. A typical prior art arrangement for performing this function is shown in the U.S. Pat. No. 3,346,700 to H. P. Anderson et al of Oct. 10, 1967. In the Anderson et al system, the ANI operation is performed by equipment which, after the calling station and the selected outgoing trunk are connected by the PBX switch train, transmits an identification pulse to the trunk circuit and back through the switch train to the calling line circuit. This pulse is applied by the line circuit to a station number matrix which generates an output signal identifying the calling station. The outgoing trunk circuit is identified by other matrix equipment when the call is extended to the central office. The station number and trunk number matrices cooperate with the remainder of the provided equipment to transmit the station and trunk number information to the central office over a data channel that is separate from the voice path used on the connection.

Although the ANI system of Anderson et al operates satisfactorily to provide the required information, its cost and complexity is increased by its use of specially provided equipment including the station number and trunk number matrices.

BRIEF SUMMARY OF THE INVENTION

It is, therefore, an object of the invention to provide improved automatic number identification equipment in a private branch exchange.

It is a further object to provide automatic number identification equipment that is of lesser cost and complexity than the prior art arrangements.

SUMMARY DESCRIPTION

The prior art ANI systems are less than ideal since they require the use of specially provided equipment to generate the calling line and trunk number information. Thus, Anderson et al requires the use of special matrices. The provision of this additional equipment is philosophically superfluous since most systems already contain equipment, e.g., a network controller, for identifying the circuits involved on each call connection. The controller obviously has this capability since it could not otherwise control the establishment of a network connection between a calling line and an outgoing trunk.

We provide an ANI system which does not require additional equipment to generate line and trunk number information. Instead, our system obtains this information from the system controller at the time the controller governs the establishment of a network connection between a calling line circuit and an outgoing PBX trunk circuit on a central office call.

Our invention is disclosed as embodied in a PBX having an end marked network together with a wired logic system controller. An outgoing call is initiated when a station user removes his subset, is connected to a register, and dials a prefix digit, such as 9, to obtain a connection to a central office trunk circuit. The register detects the dialing of the prefix digit 9 and advises the system controller that a connection to an outgoing trunk circuit is required.

In accordance with our invention, the controller determines whether the ANI equipment is idle before it proceeds further in serving the call. If the ANI equipment is available, the controller causes a trunk scanner to select an idle outgoing trunk circuit and, at the same time, causes a line scanner to identify the calling line circuit. When the trunk and line scanners have performed their required functions, the controller causes the network appearances of the identified calling line circuit and the selected outgoing trunk circuit to be marked. The network then establishes a connection between the two circuits. Immediately subsequent to the establishment of this connection, the scanners transmit station and trunk number information to ANI equipment at the PBX. Subsequently, in the same manner as described in the Anderson et al patent, the ANI information is transmitted to the central office over a path separate and apart from the voice path over which the call itself is extended to the central office.

The use of the line circuit and trunk circuit scanners for generating the information required to establish the network path, as well as for supplying the same information to the ANI equipment, eliminates the necessity of providing the special equipment that is required in the prior art ANI systems.

As already mentioned, the system controller first determines whether the ANI facilities are idle and available before it effects the establishment of a network path between a calling line and a central office trunk. If the ANI facilities are available, the connection is established and the ANI information is generated and transmitted to the central office. If, however, the controller determines that the ANI facilities are busy and thus are not immediately available, it advises the register to wait and delay the call for a short period of time such as, for example, 100 milliseconds. The controller then releases and serves other calls during this 100 millisecond interval. After 100 milliseconds, the register requests the services of the controller and again advises it that an outgoing trunk connection is required for a central office call.

If the controller determines that the ANI facilities are now available, the call is served as already described. If the ANI facilities are still busy, the register is instructed to wait for another 100 millisecond interval. In accordance with our invention, the register will wait for as many 100 millisecond intervals as may be required for the ANI facilities to become available. When the ANI equipment finally does become available, the line and trunk number information is obtained from the line and trunk scanners, respectively, applied to and stored in the ANI equipment at the PBX, and transmitted by it to the central office as already described.

The circuitry of our invention restores the ANI facilities to their idle state whenever an equipment malfunction is detected that might otherwise cause the facilities to remain indefinitely in a busy state. This insures that a register serving a central office call will not wait indefinitely for the availability of inoperable ANI equipment.

A feature of our invention is the provision of circuitry which controls the establishment of a network path between a calling line circuit and a selected trunk circuit and, at the same time, uses the network control information to supply calling line and trunk number information.

A further feature is the provision of a line scanner to identify a calling line circuit, a trunk scanner to select an idle trunk circuit, and equipment which uses output signals generated by the scanners to control the establishment of a network path between the two circuits as well as to generate line number and trunk number information for ANI equipment.

A further feature is the provision of facilities for scanning idle trunk circuits to select an idle circuit for use on a call, facilities for scanning line circuits to identify a line circuit requesting a connection to an outgoing trunk circuit, and facilities for using signals generated by the scanning to control the establishment of a network path between the identified line circuit and the selected trunk circuit as well as to transmit line and trunk number information to a central office to which the call is extended.

A further feature is the provision of a register for detecting the dialing of a prefix digit for an outgoing central office call, and with facilities for causing the register to delay further serving of the call for a predetermined period whenever ANI equipment is not available for use on the call.

A further feature is the provision of a register for detecting the dialing of an outgoing call prefix digit, facilities for determining the idle-busy status of ANI equipment, facilities for completing a network path between the calling line circuit as an idle trunk circuit if the ANI facilities are idle, and facilities for temporarily suspending further service of the call whenever the ANI equipment is currently busy.

A further feature is the provision of circuitry which permits central office calls to be completed even though the ANI equipment may be inoperable due to an equipment malfunction.

DRAWING

These and other objects and features of the invention will become more apparent upon a reading of the following description thereof taken in conjunction with the drawing in which:

FIGS. 1A, 1B, 1C, and 1D, when arranged as shown on FIG. 1E, disclose a specific illustrative embodiment of our invention;

FIG. 2 discloses additional details of the ANI control circuit;

FIG. 3 discloses additional details of the register request delay circuit;

FIG. 4A discloses the details of a basic transistor logic circuit;

DETAILED DESCRIPTION

LOGIC GATES - FIGS. 4A, 4B, 4C, 4D, and 4E

Figure 4A:
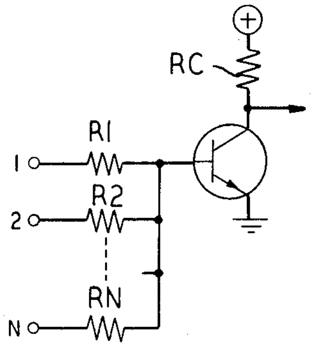
FIG. 4B illustrates the symbol used when the circuit of FIG. 4A is operated as an inverting OR gate.
FIG. 4C illustrates the symbol used when the circuit of FIG. 4A is operated as an inverting AND gate.
FIG. 4D illustrates the symbol used when the circuit of FIG. 4A is operated as an inverter.
FIG. 4E illustrates how two OR gates of the type shown on FIG. 4B may be interconnected to form a flip-flop.

The disclosed system makes extensive use of transistor resistor logic circuits in which a single transistor stage is used as an inverter, an inverting AND gate, or an inverting OR gate, depending upon the nature of the input signals applied thereto and the function to be performed by the stage. FIG. 4A discloses a schematic of a circuit which comprises a single NPN transistor, a collector resistor RC, and a plurality of input resistors, R1 – RN. The circuit of FIG. 4A is basically a single-stage inverter since a positive going signal applied to the base appears as a negative going signal at the collector, and vice versa.

Figure 4B:
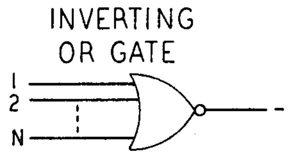
Figure 4C:
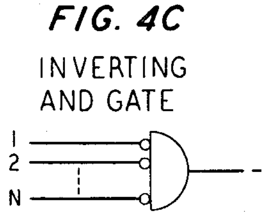

The stage may be used as an inverting OR gate, as shown in FIG. 4B, by leaving the circuit normally cut off, i.e., all inputs LOW (ground). In this case, a positive going signal applied to one or more input leads will turn the transistor ON and provide a negative going signal on the collector. The stage also may be operated as an inverting AND gate as shown on FIG. 4C. In this case, the transistor is normally held ON by a positive signal applied to one or more of its inputs. The AND condition of the circuit occurs when a ground potential is applied to all inputs. This turns the transistor OFF and produces a positive going signal at its output.

Figure 4D:
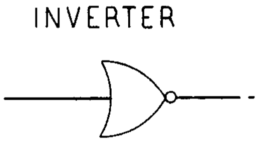

The circuit of FIG. 4A may also be operated as a single input inverter as shown on FIG. 4D.

Figure 4E:
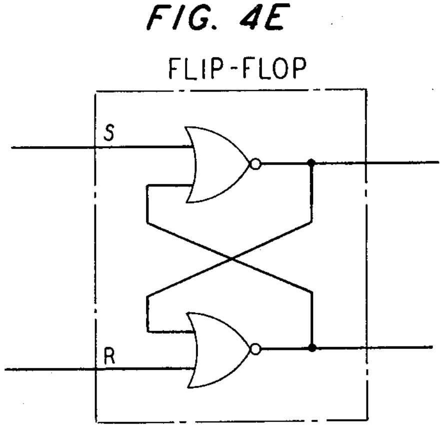

FIG. 4E discloses the symbol used when two inverter gates of the type shown in FIG. 4B are interconnected and operated as a flip-flop. The flip-flop is said to be in a set state when the upper gate is conducting and in a reset state when its lower gate is conducting. The output conductor of a conducting stage is LOW; the output conductor of a nonconducting stage is at a HIGH potential. The flip-flop is switched from one state to the other by momentarily applying a HIGH potential to the input of the nonconducting stage.

Figure 1A:
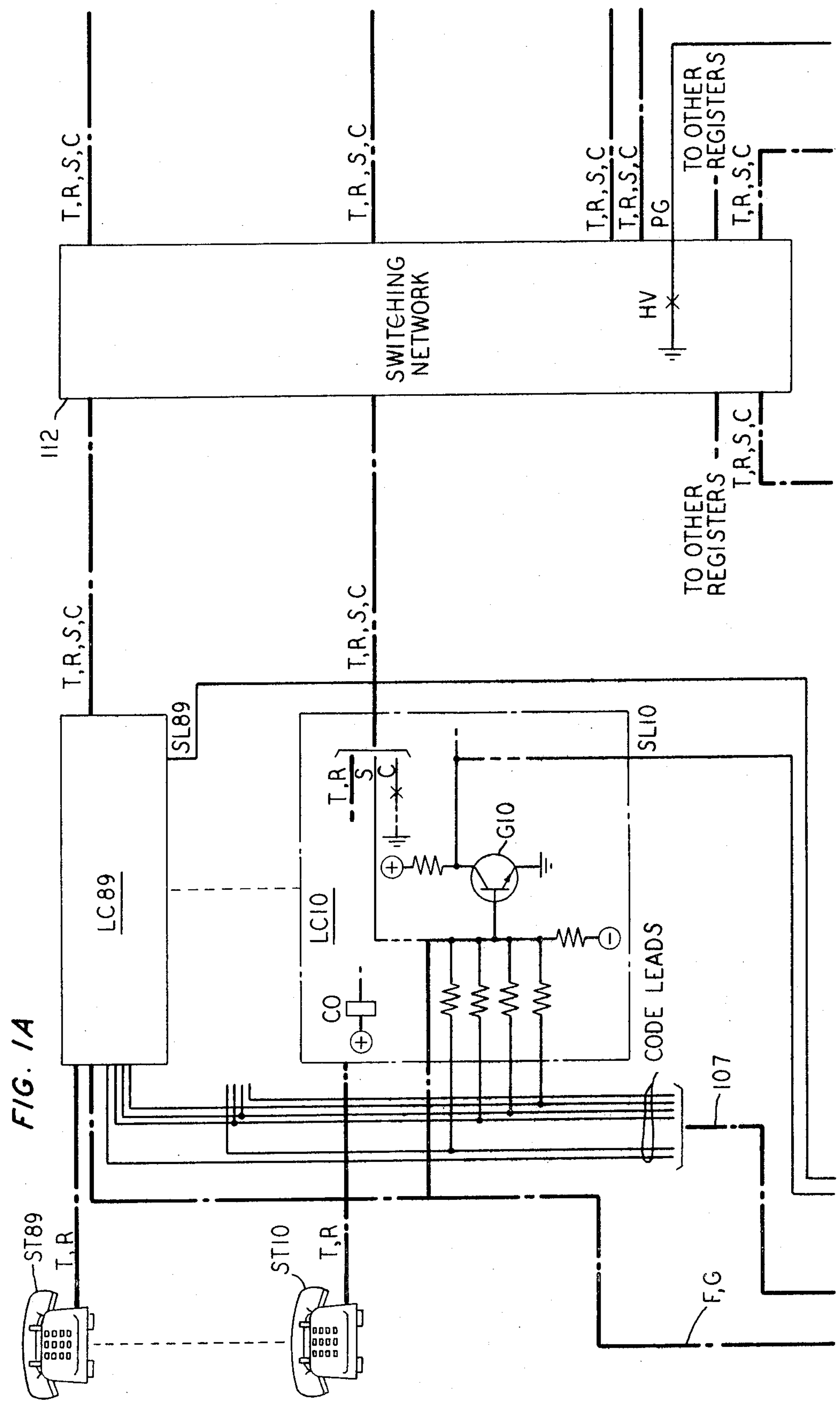
Figure 1B:
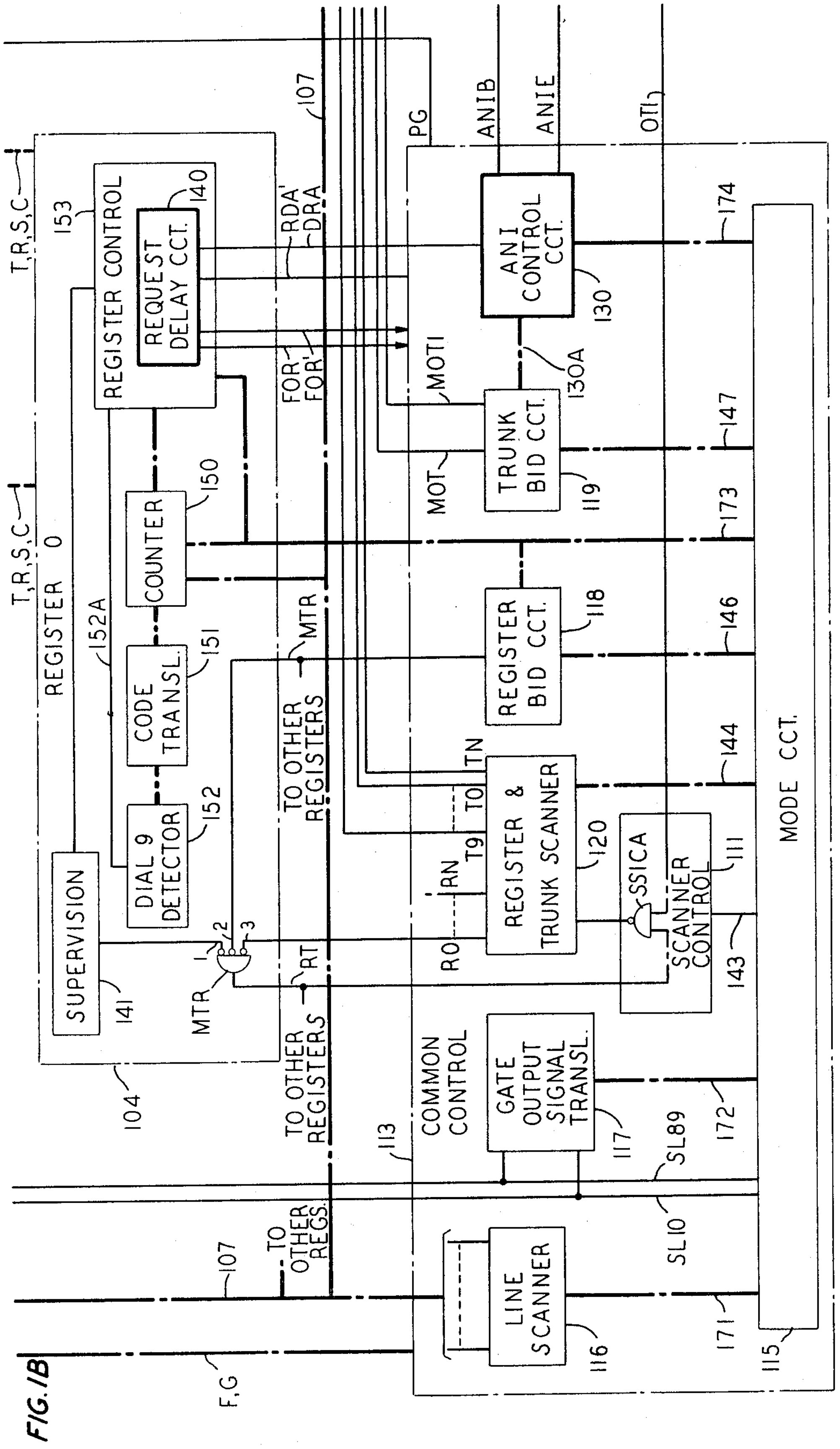
Figure 1E:
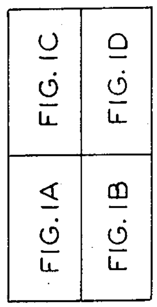
Figure 1C:
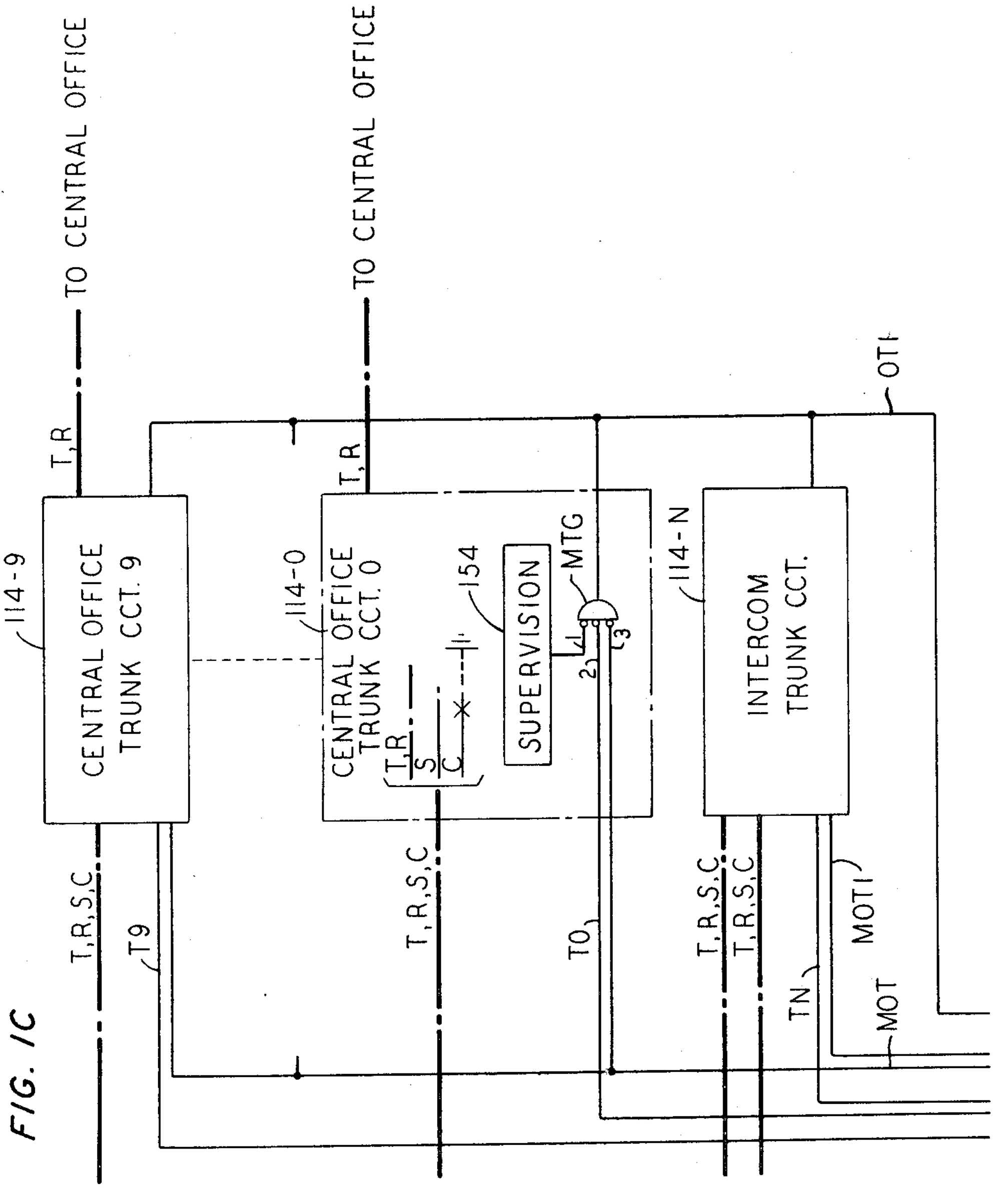
Figure 1D:
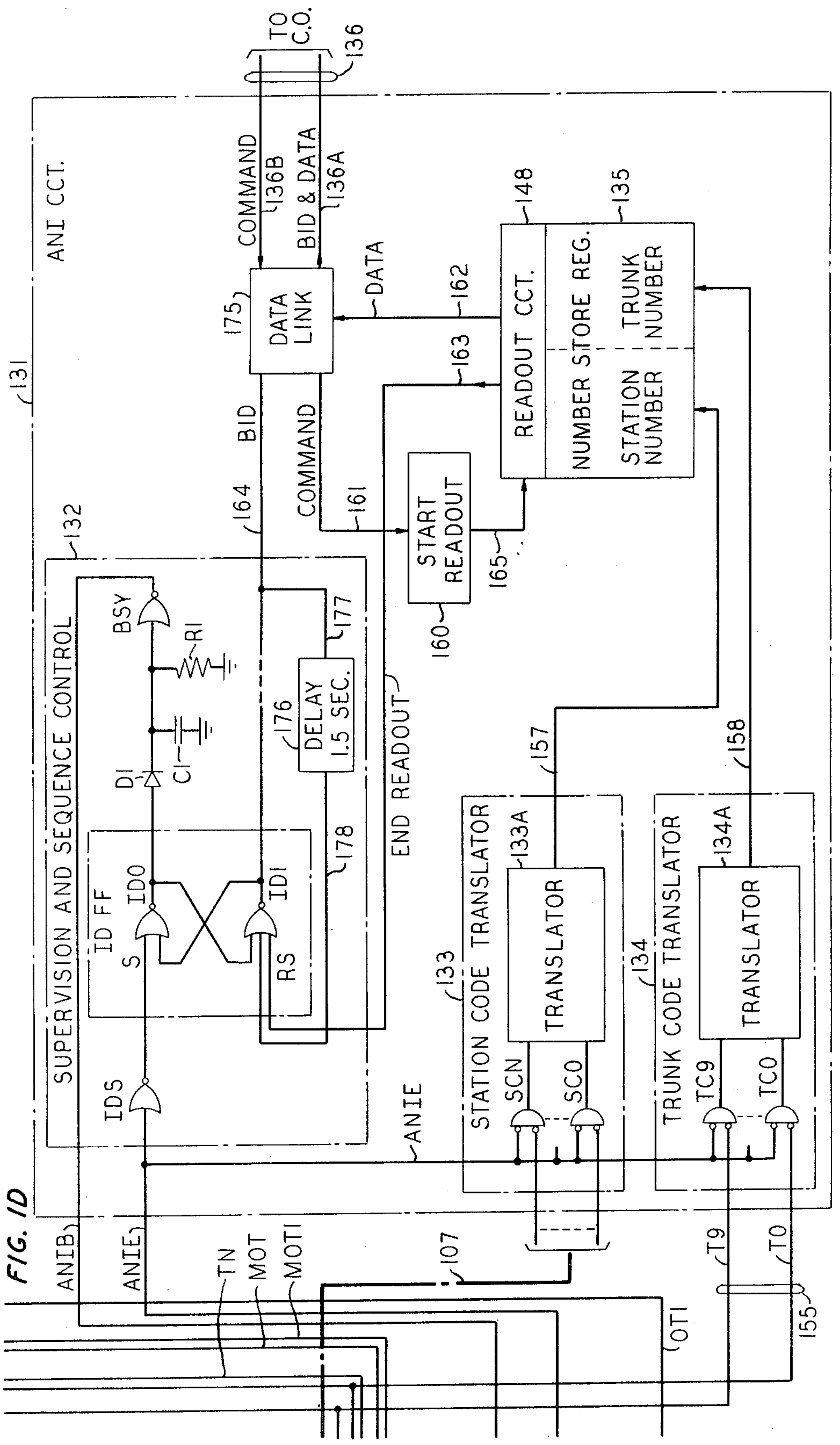
Figure 2:
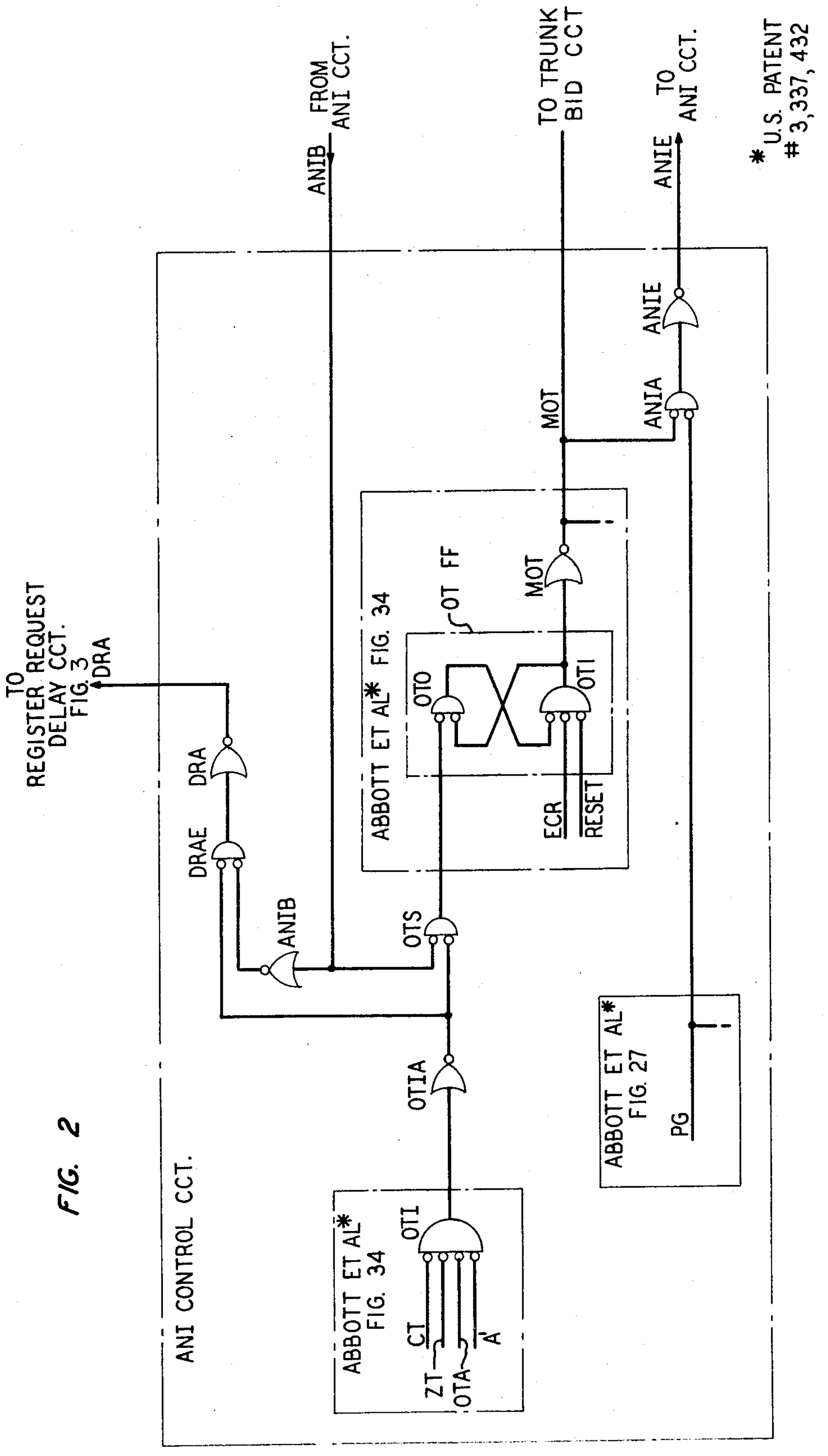

GENERAL DESCRIPTION - FIGS. 1A, 1B, and 1C

FIGS. 1A, 1B, 1C, and 1D, when arranged with respect to each other as shown in FIG. 1E, disclose a specific embodiment of our invention. The invention is disclosed as embodied in a wired logic electronic type PBX of the type disclosed in detail in the U.S. Pat. No. 3,377,432 to H. H. Abbott et al of Apr. 9, 1968. The Abbott et al specification is hereby incorporated as a part of the present specification to the same extent as if fully set forth herein.

The system comprising our invention includes an end marked network which is designated as element 112 on FIG. 1A. It further includes a plurality of PBX stations ST10 through ST89 each of which is connected to one of line circuits LC10 through LC89. Each line circuit is connected to the switching network 112 and is additionally connected by means of various conductors to common control 113 on FIG. 1B. These conductors include a set of code leads 107, conductors F and G, and an SL- conductor for each line circuit such as conductor SL10 for line circuit LC10. As subsequently described, the code leads permit common control to scan and identify the various line circuits; the SL- conductors permit common control to receive signals from the line circuits indicating their current conductive states.

The disclosed embodiment also includes a plurality of registers, such as register 104. It further includes a plurality of central office trunk circuits 114–0 through 114–9, and an intercom trunk circuit **114–*n***. The line circuits are connected to the left side (the line side) of the network; the trunk circuits are connected to the right side (the trunk side) of the network. Each register has both a line side and a trunk side appearance in order that it may be connected via the network to a trunk circuit on an incoming call or to a line circuit on an outgoing or intra-PBX call. The switching network is of the end marked type and in response to the presence of a marking potential on each side thereof, it establishes independently of the remainder of the system, a network interconnection between the circuits associated with the marked terminals.

The disclosed system is of the common control type in which the common control 113 governs the order in which the various circuits are interconnected via the network during the serving of each call. Common control receives call service requests from the line circuits, from the registers, and from the trunk circuits. Upon the receipt of each request, common control sets its mode circuit 115 to a state unique to the request. The mode circuit and common control together regulate the operation of the requesting circuit, as described in the Abbott et al patent, and control the establishment of the network connection between the requesting circuit and any circuit of the system with which the requesting circuit must be connected. The serving of a call may require a plurality of network connections to be established sequentially.

Each line circuit includes a transistor gate which is selectively controlled to assume either an ON or an OFF conductive state. A gate is said to be ON whenever it receives an energizing potential at its input (its base), and is said to be OFF when no energizing potentials are applied to its input. The conductive state of a gate, such as Gate G10 in line circuit LC10, is controlled by energizing potentials received from the G and F leads as well as from code leads 107. Each potential source is effective by itself to maintain a line circuit gate ON, independent of the other source. A potential is applied to the S lead of a line circuit at certain times and is effective to cancel the energizing potential received over the G and F leads. This causes the line circuit's gate to turn OFF, provided it is not at the same time receiving an energizing potential over one of the code leads. The code leads are also connected to the register so that it may at certain times control the conductive state of the line circuit gates.

Signals indicating the conductive state of each line circuit gate are transmitted over the SL- conductors to common control. These signals enable common control to monitor the ON and OFF state of each line circuit gate and, in turn, by means of prewired logic, to determine whether a line circuit requires action by the common control with regard to either a call initiated by or directed to the line circuit. Included among the functions performed by common control in connection with the establishment of calls are the recognition of a service request from a calling line circuit, the identification of a calling line circuit requiring a connection to a register, the selection of a called line circuit following the registration of a called number, the selection of a trunk circuit, and the identification of a calling line circuit at the time it is to be connected to the selected trunk circuit, and in turn, to the called line circuit.

Common control includes a line circuit scanner 116 having a plurality of output positions which are connected by the code leads 107 to the line circuits. Each line circuit is connected to a unique combination of codes leads. Common control also includes a gate output signal translator 117 which is connected to conductors SL10 through SL89 of the line circuits. Element 117 translates the signals received from the line circuit gates and informs common control regarding the current status of a call served by a line circuit. Common control also includes a register bid circuit 118 and a trunk bid circuit 119 which receive signals from the registers and trunk circuits, respectively, at the time these circuits require the service of common control. Common control also includes a register and trunk scanner 120 whose function is to select an idle register or an idle trunk circuit for connection to a line circuit.

The system of FIG. 1 further includes an ANI control circuit 130 within common control, a request delay circuit 140 within the register, and an ANI circuit 131. The function of the ANI circuit 131 is to transmit line and trunk information over path 136 to a central office on each call extended by the PBX to the central office by one of trunk circuits 114–0 through 114–9. The manner in which the system of FIGS. 1, including the ANI circuit 131, performs this function is subsequently described in detail.

SPECIFIC DETAILED DESCRIPTION

NORMAL SYSTEM OPERATION

The operation of the system of FIGS. 1 for the serving of calls that do not require the use of the ANI facilities is fully described in detail in the Abbott et al patent. Therefore, the following only briefly describes how such calls are served. An understanding of the system operation for the serving of these calls will facilitate an understanding of how calls requiring an ANI operation are served. The following description is made with the assumption that station ST10 initiates a call that is to be extended to a central office via trunk circuit 114–0.

Common control supplies energizing potentials over the F and G leads to hold the transistor gate G10 ON during the idle state of line circuit LC10. An off-hook condition at calling station ST10 causes the off-hook detection circuitry of the line circuit to cancel this potential and to turn its transistor OFF. This causes a change of state signal to be transmitted over conductor SL10 to the gate output and signal translator 117 to advise it that one of the line circuits is currently requesting service. In response to the receipt of this signal, and as described in the Abbott et al patent, common control initiates a scanning of all line circuits by means of scanner 116 and its code leads 107. The transistor gate in the calling line circuit is switched ON when the scanning begins and is switched OFF when the calling line circuit is scanned. A change of state signal is transmitted over signal lead SL10 to the gate output and signal translator 117 whenever the gate of line circuit LC10 switches its conductive state. The turn OFF of the gate G10 when it is scanned transmits a signal over conductor SL10 to stop the scanner in its operative position associated with line circuit LC10.

Common control now initiates the sequence of actions required to select an idle register. A register is selected by the register and trunk scanner 120 which has an operative position for each register or trunk circuit and which also has an output conductor extending from each of its positions to the register or trunk circuit with which the position is associated. The scanner output conductors are designated R0 through Rn and T0 through Tn. The R- conductors extend to the registers; the T- conductors extend to the trunk circuits. Thus, output conductor R0 extends from the scanner to register 0; output conductor T0 extends from the scanner to trunk circuit 0.

The mode circuit 115 together with common control initiates the selection of a register by applying potentials to conductors 143 and 146. These conductors extend from the mode circuit to scanner control 111 and to the register bid circuit 118, respectively. The register bid circuit responds to the potential on conductor 146 and applies an enable potential to conductor MTR which extends to all registers. With respect to register 0, it extends to input 2 of AND gate MTR which controls the selection and seizure of the register as described in Abbott et al.

A register can be seized only when all input conductors of its MTR AND gate are enabled. Input 1 of gate MTR extends to supervision circuit 141 of the register. This input is enabled whenever the register is idle. Input 2 extends to the enable conductor MTR; input 3 extends to scan conductor R0. Thus, assuming that register 0 is currently idle, input 1 of its MTR gate is currently enabled by the supervision circuit. Input 2 of the gate is now enabled by the MTR conductor from the register bid circuit. This leaves the conductive state of the gate under control of its input 3 which is connected to conductor R0 of the scanner.

The potential on the conductor 143 activates gate SSICA in the scanner control circuit 111. This, in turn, activates scanner 120 which begins a scanning operation of the register and trunk circuits. When register 0 is scanned, the enable potential on conductor R0 turns OFF gate MTR to effect a seizure of the register in the manner described in Abbott et al. The turn OFF of gate MTR applies a signal to conductor RT which extends back to the scanner control circuit 111. The receipt and this signal by gate SSICA stops the scanner 120 in its position associated with register 0. The signal on conductor RT also advises common control that an idle register has been selected and that the next sequence of operations required to serve the call may now be initiated.

Next, common control causes the register to mark its C lead trunk side appearance and also causes the line circuit LC10 to mark its C lead network appearance. The end marked network then completes a path between line circuit LC10 and register 0 without further assistance of common control.

The calling party at station ST10 now dials a prefix digit, such as the conventional prefix digit 9, to initiate an outgoing call to the central office. The digit 9 is registered by counter 150 within the register, translated by code translator 151, and detected by the dial 9 detector 152. Upon the detection of this digit, the register control circuit 153 advises common control that the digit 9 has been dialed for a central office call.

Common control initiates the sequence of circuit actions required to select and seize an idle outgoing trunk circuit. Let it be assumed that trunk circuit 114-0 is idle and is selected for use on this call. The selection of this circuit is controlled by its gate MTG which functions in a manner analogous of gate MTR for the register. Input 1 of the gate is enabled by the supervision circuit 154 whenever the trunk circuit is idle. Input 2 of the gate is connected to scan conductor TO; input 3 is connected to the group enable conductor MOT which extends to all central office trunk circuits in common. This conductor is connected to trunk bid circuit 119 and it is enabled whenever common control is in the process of selecting an idle central office trunk circuit.

At this time, common control applies potentials to conductors 147 and 143 to enable conductor MOT and to initiate a scan of the trunk circuits, respectively. Gate MTG turns OFF and effects a seizure of trunk circuit 114-0 when conductor MOT is enabled and the trunk circuit is scanned by an enable potential on conductor TO. The turn OFF of gate MTG applies a signal to conductor OT1 extending to common control. The receipt of this signal stops scanner 120 in its operative position associated with the trunk circuit. It also advises common control that an outgoing trunk circuit has been seized and that common control may therefore initiate the next sequence of circuit actions required for serving the call.

After trunk circuit 114-0 is selected, common control initiates a register call-back operation so that the line scanner 116, together with other circuitry in common control, can identify the line circuit currently connected to register 0, i.e., line circuit LC10. Common control (1) causes the gates in all line circuits to be held ON only by a potential applied to the F lead, and (2) causes the register to apply a negative call-back potential to its trunk side sleeve lead. This potential is transmitted through the network to the sleeve lead of line circuit LC10. Scanner 116 now begins a new line scanning operation. In the same manner as before, gate G10 of line circuit LC10 turns OFF when it is scanned and transmits a signal over conductor SL10. Common control receives this signal and (1) causes the register to release, (2) causes trunk circuit 119-0 to mark its C lead network appearance, and (3) causes line circuit LC10 to mark its C lead network appearance. As described in Abbott et al, the network responds to these marks and completes a connection from calling station ST10 to trunk circuit 114-0. A forward seizure signal is then extended over the T and R conductors to the central office. The central office recognizes the receipt of the call from the PBX and applies dial tone back to the connection to advise the calling party at station ST10 that he may dial the additional digits required to complete the call. In normal system operation, the preceding described operations are effected at a sufficiently rapid rate so that the calling party normally receives the second dial tone (the dial tone provided by the central office) soon after dialing of the prefix digit 9 into the PBX equipment.

et al, a readout pulse is received by the readout circuit 148 from path 165 after the ANI information is entered into register 135. In response to the receipt of this signal, the readout circuit causes the information in the number store register 135 to be read out and transmitted via the data link 175 and conductors 136A to the central office. After the ANI information is transmitted to the central office, the supervision and control circuit 132 removes the busy potential on conductor ANIB extending to the ANI control circuit 130. This constitutes an indication to common control that the ANI circuit 131 is idle and free to perform the number identification function on other calls.

DETAILED DESCRIPTION OF THE ANI CIRCUIT - FIG. 1D

The following describes further details of the operation of the ANI circuit 131. A high appears on conductor ANIE whenever the ANI control circuit 130 is idle. This conductor extends to the supervision and sequence control circuit 132 of ANI circuit 131 as well as to the station code translator 133 and the trunk code translator 134. Output conductor ANIB is low during the idle state of the ANI circuit. Also, the ID flip-flop is normally in a reset state with its gate ID1 ON and its ID0 gate OFF.

When an ANI sequence is initiated, the ANI control circuit 130 applies a low to conductor ANIE. This low turns OFF gate IDS, drives its output high, and switches the ID flip-flop to a set state by applying a high potential to the upper gate of gate IDO. This switches gate ID0 ON and gate ID1 OFF. Gate ID0 in turning ON causes gate BSY to turn OFF after an appropriate time delay whose duration is determined by the network comprising diode D1, capacitor C1, and resistor R1. The turn OFF of gate BSY applies a high potential to conductor ANIB which extends back to the ANI control circuit 130 to advise common control that the ANI circuit is currently busy. Common control then causes the registers on all subsequent central office calls to delay their service requests for one or more 100 millisecond intervals until the ANI circuit once again become idle and removes the high potential from conductor ANIB.

The turn OFF of gate ID1 when the flip-flop is set applies a high potential to BID conductor 164 which extends to the data link 175. As described in Anderson et al, the data link circuit responds to the BID signal and transmits a signal over the BID conductor of path 136A to advise the central office to prepare itself for the reception of ANI information.

The high on conductor ANIE enables the upper input of the SC- gates of the station code translator 133 and further enables the upper input of the TC- gates of the trunk code translator 134. The signals on the code lead 107 at this time provide an identification of the calling line circuit LC10; the signals on T0...T9 conductors 155 from scanner 120 provide an identification of the selected trunk circuit 114-0. These signals are applied to the lower inputs of the corresponding ones of gates SC- in the station code translator and gates TC- in the trunk code translator. Since there is a low potential on the upper input of each of these gates from conductor ANIE, the station number and trunk number identification information passes through these gates to the input of translators 133A and 134A which translate the received information into a form suitable for the register 135. The translated station number information is applied over path 157 to the station number portion of the register; the translated trunk number information is applied over path 158 to the trunk number portion of the register.

The signal on conductor BID of path 136A causes the central office to activate data receiving equipment which is connected to the DATA conductors of path 136A. The central office returns a command signal on path 136B when it is ready to receive the ANI information. This signal is received by the data link circuit 175 and applied via conductor 161 to the start readout circuit 160. This circuit, in turn, applies a signal over path 165 to readout circuit 148. The readout circuit reads out both portions of the register, and transmits the readout information over path 162, through the data link and over the DATA conductors 136A to the central office.

When all the data has been transmitted, readout circuit 135A transmits an end readout signal over path 163 to reset flip-flop ID1 in the supervision and control circuit 132. This removes the BID signal to the central office and turns ON gate BSY which drives conductor ANIB low extending back to the ANI control circuit 130. The low on conductor ANIB advises common control that the ANI circuit is now idle and is free to serve other dial 9 calls.

Normally, the ANI circuit 131 performs its work function in about 200 milliseconds and then restores to its normal or nonbusy state. It resets the ID flip-flop when it restores to normal as already described. The resetting of the flip-flop applies a potential to conductor ANIB to advise common control that it may now serve another central office call.

It is possible for certain equipment failures to block (1) the successful transmission of ANI information to the central office or (2) the successful registration of the information in the central office. If provisions were not made for this eventuality, it is possible that the ANI circuit 131 might remain busy indefinitely. This, in turn, would (1) prevent the ID flip-flop from being reset, (2) maintain a permanent busy signal on conductor ANIB, and (3) cause a register serving a central office call to wait indefinitely for successive 100 millisecond intervals.

In order to prevent equipment malfunctions from preventing the completion of other central office calls, we provide a delay circuit 176 which is interconnected between the BID conductor 164 and the middle input of gate ID1 of the flip-flop. The delay circuit 176 will, in the event of equipment failure, reset the ID flip-flop 1.5 seconds after the ANI circuit is seized on a call. This 1.5 second interval provides more than enough time for the successful transmission of the ANI information and, therefore, does not interfere with the normal system operation. However, by insuring that the ID flip-flop will be reset no more than 1.5 seconds following the seizure of the ANI circuit, it allows the PBX to continue to serve central office calls even though the ANI circuitry is not functioning properly.

SERVING OF A CALL THAT REQUIRES AUTOMATIC NUMBER IDENTIFICATION

The following describes the additional circuitry and equipment required to provide the automatic number identification function on a call of the type just described. The additional circuitry required in common control comprises the ANI control circuit 130. The register requires the addition of the request delay circuit 140. Circuit 140 is controlled by the register as well as by the conductors extending to common control and designated FOR, FOR', DRA, and RDA'. The ANI circuit 131 comprises the remainder of the additional required circuitry.

In order to describe the operation of our invention, let it be assumed (1) that a central office call is initiated at station ST10, and (2) that common control selects trunk circuit 114–0 for use in serving the call. The circuit operations proceed as already described except that the ANI circuitry becomes involved after common control detects the dialing of the prefix digit 9, and determines that a connection to an outgoing trunk circuit is required. Before initiating a trunk scanning operation, common control first determines the current idle-busy state of the ANI circuit 131. This determination is under control of the potential on the ANIB lead which extends to the ANI control circuit 130. If the potential on lead ANIB indicates that the ANI circuit 131 is busy, the ANI control circuit 130 transmits an ANI busy signal to the register over path DRA. This signal causes the register to suspend further serving of the call for a 100 millisecond timing interval during which it withdraws its service request to common control. Common control is free to serve other calls during this interval.

After 100 milliseconds, the register again requests the services of common control and applies signals representing the prefix digit 9 to the code leads 107 so that common control can once again detect the presence of the prefix digit 9. If the ANI circuit 131 is still busy, the above timing process is again repeated for another 100 milliseconds. This sequence can be repeated as many times as required until the ANI circuit becomes idle.

Regardless of whether it is on a first attempt or after one or more 100 millisecond timing intervals, if the ANI circuit 131 is idle when common control is seized by a register on a central office call, the ANI control circuit 130 detects this idle state and causes common control to begin a trunk selection operation. The trunk bid circuit 119 now applies an enable potential to conductor MOT which extends to all central office trunk circuits. At the same time, common control causes the scanner 120 to initiate a scanning operation. The trunk bid circuit 119 and scanner 120 cooperate in the manner already described to select an idle trunk circuit. Let it be assumed that trunk circuit 114–0 is the first idle circuit to be scanned and that it, therefore, is selected when its MTG gate turns OFF. The high potential on conductor OT1 as gate MTG turns OFF terminates the scanning operation under control of gate SSICA.

Next, common control initiates the remainder of the circuit operations required to interconnect calling line circuit LC10 with trunk circuit 114–0. As already described, this sequence first includes a register call-back operation so that the system can identify the line circuit currently connected to the register 0, i.e., line circuit LC10. During this operation, (1) the register transmits a negative 24 volt potential back through the network to the sleeve lead appearance of calling line circuit LC10, and (2) the scanner 116 begins a line scanning operation. Gate G10 of calling line circuit LC10 turns OFF when it is scanned and transmits a signal back over conductor SL10 to common control to stop the line scanner in its operative position associated with the line circuit. While these operations take place, the register and trunk scanner 120 remains in its operative position associated with the selected outgoing central office trunk circuit, namely circuit 114-0 After line circuit LC10 has been scanned and identified, common control causes both the line circuit and trunk circuit 114–0 to mark their C lead network appearances. The switching network responds to these marking potentials and completes a path between the two circuits.

On FIGS. 1, the code leads 107, which comprise the output conductors of line scanner 116, extend to the input of the station code translator 133 within the ANI circuit 131. The TO . . . T9 output conductors of the register and trunk scanner 120 are connected via path 155 to the input of the trunk code translator 134 within the ANI circuit 131. Line scanner 116 is currently in its operative position associated with calling line circuit LC10; scanner 120 is currently in its operative position associated with trunk circuit 114-0. Therefore, the signal information on the conductors of path 107 provide an identification of the calling line circuit; the signal information on the conductors of path 155 identifies trunk circuit 114–0.

The switching network 112 applies a signal to conductor PG when it completes the establishment of a network connection. With reference to the presently described call, common control receives the signal on conductor PG when the network establishes a path between line circuit LC10 and trunk circuit 114–0. Common control responds to this signal and initiates the sequence of circuit actions required to return it to its idle state in which it is free to serve other calls. Before resetting to its idle state, common control effects an ANI transmission by applying an enable pulse to conductor ANIE which extends from the ANI control circuit 130 to the supervision and sequence control circuit 132 within ANI circuit 131.

Conductor ANIE also extends to the inputs of the SC- gates in the station code translator 133 and to the inputs of the TC- gates in the trunk code translator 134. An enable signal on conductor ANIE performs a gating function which permits the translators 133 and 134 to receive and respond to the station and trunk identity information on paths 154 and 155, respectively. The received information is translated, applied to paths 157 and 158, and entered into the station number and trunk number portions of the number store register 135.

The supervision and sequence control circuit 132 applies a busy potential to conductor ANIB for the duration of time required for the ANI circuit 131 to receive the ANI information and to transmit it to the central office. These operations are similar to that already described and disclosed in the aforementioned H. P. Anderson et al U.S. Pat. No. 3,346,700 which is hereby incorporated as a part of the present specification to the same extent as if fully disclosed herein. In Anderson

DETAILED DESCRIPTION OF THE ANI CONTROL CIRCUIT - FIG. 2

All inputs to gate OTI are low when common control reads out the register and determines that the prefix digit 9 has been dialed for a central office call. This turns the gate OFF and turns gate OTIA ON. A low potential is on conductor ANIB whenever the ANI circuit 131 is idle. Therefore, both inputs of gate OTS are low when gate OTIA is ON and conductor ANIB is low. This causes gate OTS to turn OFF and switch the OT flip-flop to its set state. The setting of the flip-flop turns OFF gate OT1 and turns ON gate OT0. The resultant high on the output of gate OT1 turns ON gate MOT and drives its output low. The output of this gate is connected to conductor MOT which extends to one input of the selection gate of all central office trunk circuits. The low now on the conductor partially enables all of these trunk circuits so that one of them may be selected for use on the call.

Common control receives a signal on conductor PG when a network connection is subsequently established between the calling line circuit and the selected trunk circuit. This signal drives the PG conductor low momentarily and turns OFF gate ANIA. Conductor MOT is already low since the OT flip-flop is currently in a set state. The high on the output of this gate turns ON gate ANIE which drives lead ANIE low. This low is transmitted to the ANI circuit 131 and effects storage of the ANI information in register 135 as already described.

Subsequently, lead PG returns to a high potential state, turns on gate ANIA, which turns gate ANIE OFF and terminates the ANI circuit seizure signal by making the ANIE lead high. The high potential on lead PG at the termination of the negative going pulse also initiates circuit actions within common control to cause that circuit to return to its idle state. This is fully described in the Abbott et al patent.

The above sequence is different from that just described if the ANI circuit 131 is busy serving another central office call. In this instance, conductor ANIB is high and this high holds gate OTS ON to prevent the OT flip-flop from being set when gate OT1 turns OFF. Also at this time, the high on conductor ANIB turns ON gate ANIB which drives the lower input of gate DRAE low. The low from the output of gate OTIA is applied to the upper input of gate DRAE so that it now turns OFF and drives its output high.

In short, whenever conductor ANIB is high at a time when gate OTI turns OFF upon the detection of a central office call, gate OTIA turns ON and turns gate DRAE OFF. The turn OFF of gate DRAE turns ON gate DRA which drives its output conductor DRA low. This conductor extends to the register circuit where it causes that circuit to wait for 100 milliseconds before it again requests the services of common control. As described elsewhere, the register may be caused to wait a plurality of 100 millisecond intervals for the ANI circuit to revert to its idle state.

DETAILED DESCRIPTION OF THE REGISTER REQUEST DELAY CIRCUIT - FIG. 3

Figure 3:
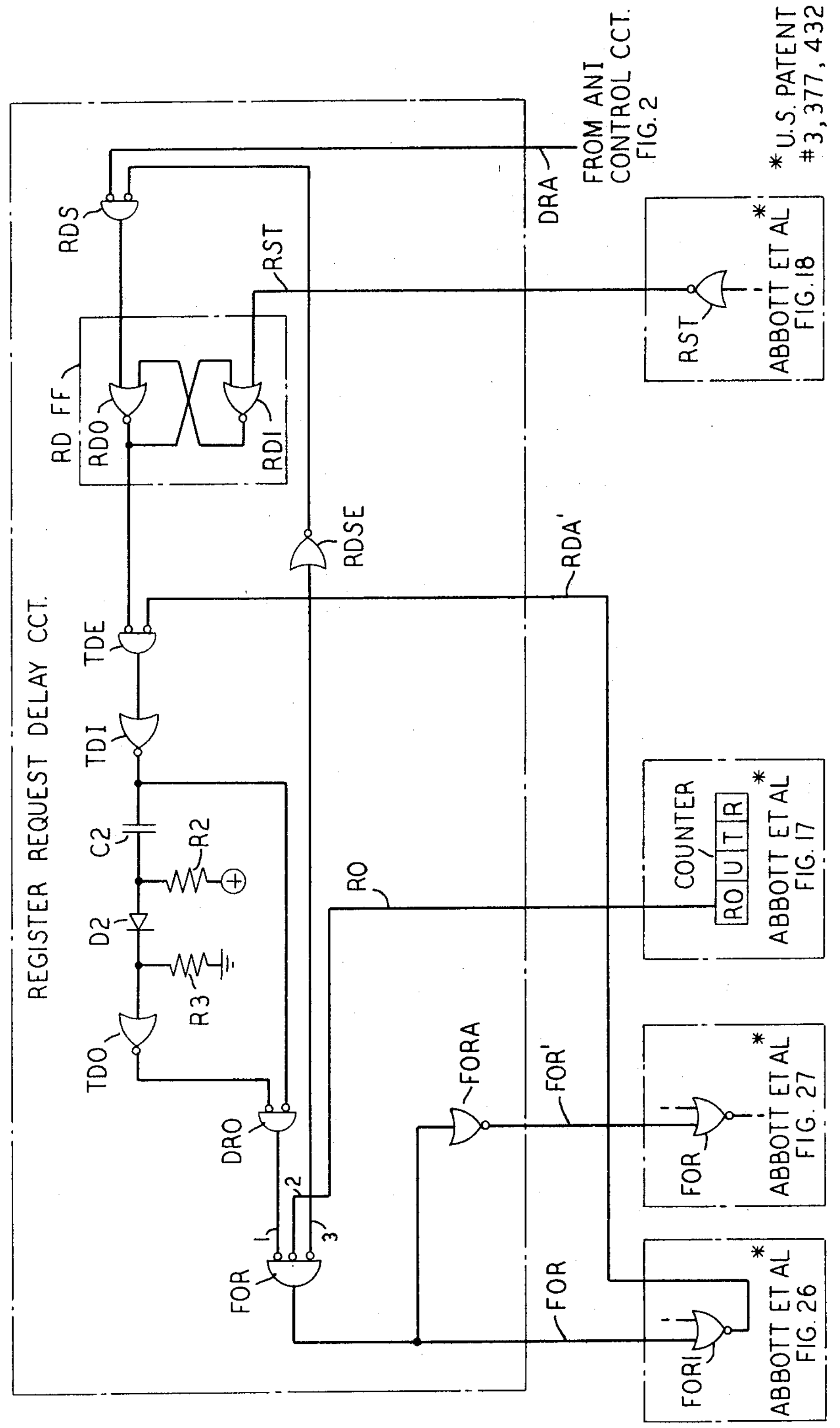

The circuitry shown on FIG. 3 is used when a call being served by the register must be delayed because the ANI circuit 131 is currently busy. The busy state of the ANI circuit causes a low potential to be applied to conductor DRA. Common control applies a high to conductor RDA' and a low to conductor RO whenever it reads out a register. Therefore, in serving the present call, common control applies a high potential to conductor RDA' when it reads out register 0 and detects the prefix digit 9. The high potential on this conductor turns ON gates RDSE, TDE, and FOR. The low on conductor RO extends to input 2 of gate FOR.

The turn ON of gate RDSE applies a low to the lower input of gate RDS which at this time has a low on its upper input from conductor DRA since the ANI circuit is assumed to be busy. With a low applied to both of its inputs, gate RDS turns OFF and applies a high to the RDO gate to switch the RD flip-flop from a reset to a set state. The output of gate RDO goes low at this time and applies a low to the upper input of gate TDE. This places the conductive state of gate TDE under control of the potential applied to conductor RDA'.

Common control applies a low to conductor RDA' and resets to its normal state when it receives an ANI busy signal on lead ANIB after a register readout operation. The low on conductor RDA' turns OFF gate TDE since flip-flop RD is currently set. It also turns OFF gate FOR. The output of gate TDE turns ON gate TDI. The negative going voltage transition at the output of gate TDI turns OFF gate TDO which holds gate DRO ON. This condition is maintained for 100 milliseconds until capacitor C2 charges sufficiently via resistor R2 to forward bias diode D2 which then turns ON gate TDO. When gate TDO turns ON, gate DRO turns OFF and turns ON gate FOR to drive conductor FOR low. The low on conductor FOR turns gate FORA ON and drives conductor FOR' high. This signals the common control circuit that the register is again requesting a readout operation.

Subsequently, when common control again selects the register for a readout, lead RDA' goes high, holds gate FOR ON, and turns gate TDE ON. This turns OFF gate TD1 and resets the 100 millisecond time delay circuit. If the ANI circuit is still busy when lead RDA' returns to its low state at the end of the readout, another 100 millisecond timing interval will be initiated as described above.

When the register circuit returns to its idle state after a successful readout or, alternatively, when the calling party abandons the call, conductor RST goes high to switch the flip-flop to its reset state. This holds the gate TDE ON and gate TD1 OFF. This, in turn, disables the request delay circuit until the RD flip-flop is subsequently set on another call.

What is claimed is:

1. In a switching system, a switching network having line circuits connected to its line side and trunk circuits connected to its trunk side, means for detecting the receipt from a calling one of said line circuits of a dialed prefix digit signifying a request for a network connection to one of said trunk circuits, first means responsive to said detection for identifying said calling line circuit and for supplying a signal identifying said line circuit to said network, second means responsive to said detection for selecting an idle one of said trunk circuits and for supplying a signal identifying said selected trunk circuit to said network, said network being responsive to the receipt of said identification signals from said first and second means for establishing a connection between said calling line circuit and said selected trunk circuit, and means for transmitting information from said first and second means to a central office identifying said calling line circuit and said selected trunk circuit.

2. The system of claim 1 in which said means for transmitting comprises automatic number identification equipment, means for transmitting information from said first and second means to said automatic number identification equipment identifying said calling line circuit and said selected trunk circuits, and means in said automatic number identification equipment responsive to the receipt of said information for transmitting said information to said central office.

3. In a switching system, a switching network having line circuits connected to its line side and trunk circuits and registers connected to its trunk side, said network being effective upon the initiation of a call at a calling one of said line circuits for connecting said calling line circuit to an idle one of said registers, means in said register for detecting the receipt from said calling line circuit of a prefix digit signifying a request for a network connection from said calling line circuit to one f said trunk circuits, first means responsive to said detection for identifying said calling line circuit and for supplying a signal identifying said line circuit to said network, second means responsive to said detection for selecting an idle one of said trunk circuits and for supplying a signal identifying said selected trunk circuit to said network, said network being responsive to the receipt of said identification signals from said first and second means for establishing a connection between said calling line circuit and said selected trunk circuit, and means for transmitting information from said first and second means to a central office identifying said calling line circuit and said selected trunk circuit.

4. The system of claim 3 in which said means for transmitting comprises automatic number identification equipment, means for transmitting information from said first and second means to said automatic number identification equipment identifying said calling line circuit and said selected trunk circuits, and means in said automatic number identification equipment responsive to the receipt of said information for transmitting said information to said central office.

5. The system of claim 4 in combination with third means responsive to said detection for determining whether said automatic number identification equipment is currently idle or busy, means responsive to a determination that said automatic number identification equipment is busy for delaying the operation of said first and second means in its serving of said call for a predetermined time interval, said third means being effective after the end of said interval for determining the current idle or busy state of said automatic number identification equipment, and means responsive to a determination after the end of said interval that said automatic number identification equipment is idle for enabling the operation of said first and second means.

6. The system of claim 5 in combination with means for continuing the serving of calls while said automatic number identification equipment is in a busy state due to an equipment malfunction comprising, means for normally returning said automatic number identification equipment to an idle state after said information for a call is transmitted to said central office, and means effective upon the failure of said last named means and after a predetermined time delay for returning said automatic number identification equipment to an idle state.

7. In a switching system, a switching network having a plurality of line circuits connected to its line side and a plurality of central office trunk circuits and a plurality of registers connected to its trunk side, said network being effective upon the initiation of a call from a calling one of said line circuits for connecting said calling line circuit to an idle one of said registers, means in said register for detecting the receipt from said calling line circuit of a dialed prefix digit signifying a request for a network connection from said line circuit to an idle one of said trunk circuits, means including a line scanner responsive to said detection for scanning said line circuits to identify said calling line circuit and for supplying a signal identifying said line circuit to said network, means including a trunk scanner responsive to said detection for scanning said trunk circuits to select an idle one of said trunk circuits and for supplying a signal identifying said selected trunk circuit to said network, said network being responsive to the receipt of said identification signals from said scanners for establishing a connection between said calling line circuit and said selected trunk circuit, automatic number identification equipment, means for transmitting information from said scanners to said automatic number identification equipment identifying said calling line circuit and said selected trunk circuit, and means in said automatic number identification equipment responsive to the receipt of said information for transmitting said information to said central office.

8. The system of claim 7 in combination with third means responsive to said detection for determining whether said automatic number identification equipment is currently idle or busy, means responsive to a determination that said automatic number identification equipment is busy for delaying the operation of said first and second means in its serving of said call for a predetermined time interval, said third means being effective after the end of said interval for determining the current idle or busy state of said automatic number identification equipment, and means responsive to a determination after the end of said interval that said automatic number identification equipment is idle for enabling the operation of said first and second means.

9. The system of claim 8 in combination with means for continuing the serving of calls while said automatic number identification equipment is in a busy state due to an equipment malfunction comprising, means for normally returning said automatic number identification equipment to an idle state after said information for a call is transmitted to said central office, and means effective upon the failure of said last named means and after a predetermined time delay for returning said automatic number identification equipment to an idle state.

10. In a switching system, a switching network having line circuits connected to its line side and central office trunk circuits and registers connected to its trunk side, said network being effective upon the initiation of a call from a calling one of said line circuits for connecting said calling line circuit to an idle one of said registers, a system controller, means in said register for registering a dialed prefix digit received from said calling line circuit and signifying a request for a network connection from said line circuit to an idle one of said trunk circuits, means in said register for transmitting a signal representing said digit to said controller, means in said controller for detecting the receipt of said signal, means including a line scanner responsive to said detection for scanning said line circuits to identify said calling line circuit and for supplying a signal identifying said line circuit to said network, means including a trunk scanner responsive to said detection for scanning said trunk circuits to select an idle one of said trunk circuits and for supplying a signal identifying said selected trunk circuit to said network, said network being responsive to the receipt of said indentification signals from said scanners for establishing a connection between said calling line circuit and said selected trunk circuit under control of both of said scanners, automatic number identification equipment, means for transmitting information from said scanners to said automatic number identification equipment identifying said calling line circuit and said selected trunk circuit, and means in said automatic number identification equipment responsive to the receipt of said information for transmitting said information to said central office.

11. The system of claim 10 in combination with third means responsive to said detection of the receipt of said digit by said controller for determining whether said automatic number identification equipment is currently idle or busy, means responsive to a determination that said automatic number identification equipment is busy for aborting the operation f said first and second means and for causing said register to delay the serving of said call for a predetermined time interval by terminating the transmission of said digit signal to said controller, means effective at the end of said interval for again transmitting a signal representing said digit from said register to said controller, and means responsive to a subsequent determination that said automatic number identification equipment is idle for enabling the operation of said first and second means.

12. The system of claim 11 in combination with means for continuing the serving of calls while said automatic number identification equipment is in a busy state due to an equipment malfunction comprising, means for normally returning said automatic number identification equipment to an idle state after said information is transmitted to said central office, and means effective upon the failure of said last named means and after a predetermined time delay for returning said automatic number identification equipment to an idle state.

13. In a switching system, an end marked switching network having line circuits connected to its line side and central office trunk circuits and registers connected to its trunk side, said network being effective upon the initiation of a call from a calling one of said line circuits for connecting said calling line circuit to an idle one of said registers, a system controller, means in said register for registering a dialed prefix digit receiving from said calling line circuit and signifying a request for a network connection from said line circuit to an idle one of said trunk circuits, means for transmitting a signal representing said digit from said register to said controller, means in said controller for detecting the receipt of said signal, means including a line scanner responsive to the receipt of said digit by said controller for scanning said line circuits to identify said calling line circuit, means including a trunk scanner responsive to the receipt of said digit by said controller for scanning said trunk circuits to select an idle one of said trunk circuits, means responsive to said identification and to said selection for applying marking potentials to the network appearances of said calling line circuit and said selected trunk circuit, said network being responsive to said potentials to establish a connection between said calling line circuit and said selected trunk circuit, automatic number identification equipment, means for transmitting information from said scanners to said automatic number identification equipment identifying said calling line circuit and said selected trunk circuit, and means in said automatic number identification equipment responsive to the receipt of said information for transmitting said information to said central office.

14. The system of claim 13 in combination with third means responsive to said detection of the receipt of said digit by said controller for determining whether said automatic number identification equipment is currently idle or busy, means responsive to a determination that said automatic number identification equipment is busy for aborting the operation of said first and second means and for causing said register to delay the serving of said call for a predetermined time interval by terminating the transmission of said digit signal to said controller, means effective at the end of said interval for again transmitting a signal representing said digit from said register to said controller, and means responsive to a subsequent determination that said automatic number identification equipment is idle for enabling the operation of said first and second means.

15. The system of claim 14 in combination with means for continuing the serving of calls while said automatic number identification equipment is in a busy state due to an equipment malfunction comprising, means for normally returning said automatic number identification equipment to an idle state after said information is transmitted to said central office, and means effective upon the failure of said last named means and after a predetermined time delay for returning said automatic number identification equipment to an idle state.

16. In a switching system, an end marked type of switching network having line circuits connected to its line side and central office trunk circuits and registers connected to its trunk side, said network being effective upon the initiation of a call from a calling one of said line circuits for connecting said calling line circuit to an idle one of said registers, a system controller, means in said register for registering a dialed prefix digit received from said calling line circuit and signifying a request for a network connection from said line circuit to an idle one of said trunk circuits, means for transmitting a signal representing said digit from said register to said controller, means in said controller for detecting the receipt of said signal, a line scanner having output conductors extending to said line circuits, said line scanner being responsive to the receipt of said signal by said controller for applying scanning potentials to its output conductors to identify said calling line circuit, a trunk scanner having output conductors extending to said trunk circuits, said trunk scanner being responsive to the receipt of said signal by said controller for applying scanning potentials to its output conductors to select an idle one of said trunk circuits, means responsive to said identification and to said selection for applying marking potentials to the network appearances of said calling line circuit and said selected trunk circuit, said network being responsive to said marking potentials to establish a connection between said calling line circuit and said selected trunk circuit, automatic number identification equipment, means connecting said output conductors of said scanner with automatic number identification equipment for transmitting information from said scanners to said equipment identifying said calling line circuit and said selected trunk circuit, and means in said automatic number identification equipment responsive to the receipt of said information for transmitting said information to said central office.

17. In a switching system, a switching network having a plurality of line circuits connected to its line side and a plurality of central office trunk circuits and a plurality of registers connected to its trunk side, said network being effective upon the initiation of a call from a calling one of said line circuits for connecting said calling line circuit to an idle one of said registers, means in said register for detecting the receipt from said calling line circuit of a dialed prefix digit signifying a request for a network connection from said line circuit to an idle one of said trunk circuits, a line scanner having output conductors extending to said line circuits, said line scanner being responsive to said detection for applying scanning signals to its output conductors to identify said calling line circuit and for supplying a signal identifying said line circuit to said network, a trunk scanner having output conductors extending to said trunk circuits, said trunk scanner being responsive to said detection for applying scanning signals to its output conductors to select an idle on eof said trunk circuits and for supplying a signal identifying said selected trunk circuit to said network, said network being responsive to the receipt of said identification signals from said scanners for establishing a connection between said calling line circuit and said selected trunk circuit under control of both of said scanners, automatic number identification equipment, means connecting said output conductors of said scanners with said automatic number identification equipment, for transmitting information from said scanners over said output conductors to said equipment identifying said calling line circuit and said selected trunk circuit, and means in said automatic number identification equipment responsive to the receipt of said information for transmitting said information to said central office.

18. A method of operating a telephone switching system comprising the steps of (1) scanning line circuits to identify a calling line circuit requesting a network connection to a central office trunk circuit, (2) scanning central office trunk circuits to select an idle trunk circuit, (3) establishing a network path from said calling line circuit to said selected trunk circuit under control of scanning signals generated when said line circuit is identified and said trunk circuit is selected, (4) generating calling line circuit and selected trunk circuit number information under control of said scanning signals, and (5) transmitting said number information to said central office.

* * * * *

UNITED STATES PATENT OFFICE
CERTIFICATE OF CORRECTION

Patent No. 3,725,596 Dated April 3, 1973

Inventor(s) Rodney Robert Maxon and Henry August Meise, Jr.

It is certified that error appears in the above-identified patent and that said Letters Patent are hereby corrected as shown below:

The amended Abstract of the Disclosure was not inserted for the original abstract.

Column 8, line 52, "119-0" should be --114-0--.

Column 10, line 55, "154" should be --107--.

Column 13, line 16, after "extends" insert --over path 130A, through the trunk bid circuit 119--.

Column 14, line 56, after "and" insert --central office--.

Column 15, line 12, after "trunk" change "circuits" to --circuit--;

line 18, after "and" insert --central office--;

line 22, after "said" second occurrence insert --one--;

line 25, "f" should be --of--;

line 57, after "for" insert --again--.

Column 16, line 14, after "said" insert --one--;

line 37, cancel "said" and insert --a--;

line 47, after "for" insert --again--.

UNITED STATES PATENT OFFICE
CERTIFICATE OF CORRECTION

Patent No. 3,725,596 Dated April 3, 1973

Inventor(s) Rodney Robert Maxon and Henry August Meise, Jr.

It is certified that error appears in the above-identified patent and that said Letters Patent are hereby corrected as shown below:

Column 17, line 3, after "said" insert --one--;

line 29, cancel "said" and insert --a--;

line 36, change "f" to --of--;

line 65, after "said" and before "register" insert --one--;

lines 65 and 66, "receiving" should be --received--.

Column 18, line 24, cancel "said" and insert --a--;

line 60, after "said" and before "register" insert --one--.

Column 19, line 23, change "said" to --a--;

line 31, after "said" and before "register" insert --one--.

Column 20, line 7, change "on eof" to --one of--;

line 22, change "said" to --a--;

line 35, change "said" to --a--, before the period insert --to which said selected trunk circuit is connected--.

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,725,596 Dated April 3, 1973

Inventor(s) Rodney Robert Maxon and Henry August Meise, Jr.

It is certified that error appears in the above-identified patent and that said Letters Patent are hereby corrected as shown below:

On the cover sheet, the abstract paragraph should be canceled and the following paragraph substituted therefor:

-- A PBX is disclosed having equipment for automatically generating and transmitting calling station and trunk number information to a central office on outgoing calls. The disclosed system is an improvement in the art in that it does not require the use of additional equipment, such as identification matrices, for generating the number information. Instead, it obtains this information from the same circuitry that controls the establishment of a network connection from the calling line circuit to the central office trunk circuit. --

Signed and sealed this 27th day of November 1973.

(SEAL)
Attest:

EDWARD M.FLETCHER,JR.
Attesting Officer

RENE D. TEGTMEYER
Acting Commissioner of Patents